(12) United States Patent
Ashburn et al.

(10) Patent No.: US 6,287,469 B1
(45) Date of Patent: Sep. 11, 2001

(54) HOME WASTEWATER TREATMENT PLANT

(75) Inventors: Paul R. Ashburn; Edward T. Cogar, both of Morgantown, WV (US)

(73) Assignee: Ashco-A-Corporation, Morgantown, WV (US)

( * ) Notice: Subject to any disclaimer, the term of this patent is extended or adjusted under 35 U.S.C. 154(b) by 0 days.

(21) Appl. No.: 09/174,433

(22) Filed: Oct. 16, 1998

Related U.S. Application Data

(60) Provisional application No. 60/062,286, filed on Oct. 17, 1997.

(51) Int. Cl.[7] .................................. C02F 3/04; C02F 3/30
(52) U.S. Cl. .......................... 210/605; 210/617; 210/629; 210/631; 210/121; 210/151; 210/202; 210/263; 210/290; 210/748; 210/754
(58) Field of Search ........................... 210/605, 615–617, 210/620, 629, 631, 290, 150, 151, 121, 138, 202, 258, 263, 748, 532.2, 754

(56) References Cited

U.S. PATENT DOCUMENTS

| | | | |
|---|---|---|---|
| 2,987,186 | 6/1961 | Burgoon et al. | 210/197 |
| 3,057,796 | 10/1962 | Davis | 210/207 |
| 3,202,285 | 8/1965 | Williams | 210/195 |
| 3,717,251 | * 2/1973 | Hampton . | |
| 3,731,812 | * 5/1973 | Stone . | |
| 3,789,986 | * 2/1974 | Oldham et al. . | |
| 4,293,421 | 10/1981 | Green | 210/603 |
| 4,822,485 | * 4/1989 | Mayer . | |
| 4,895,645 | * 1/1990 | Zorich, Jr. . | |
| 4,925,552 | * 5/1990 | Bateson et al. . | |
| 5,049,265 | * 9/1991 | Boyd et al. . | |
| 5,076,929 | * 12/1991 | Fuchs et al. . | |
| 5,156,742 | * 10/1992 | Struewing . | |
| 5,352,357 | * 10/1994 | Perry . | |
| 5,486,291 | * 1/1996 | Todd et al. . | |
| 5,534,141 | 7/1996 | McAnaney et al. | 210/110 |
| 5,597,477 | 1/1997 | Harry, III | 210/86 |
| 5,645,725 | 7/1997 | Zitzelsberger et al. | 210/605 |
| 5,667,689 | 9/1997 | Graves | 210/621 |
| 5,676,828 | 10/1997 | Kallenbach et al. | 210/117 |

FOREIGN PATENT DOCUMENTS

| | | |
|---|---|---|
| 2073165 | * 3/1980 | (GB) . |
| 2077712 | * 6/1980 | (GB) . |
| 62-114699 | * 5/1987 | (JP) . |
| 1-124192 | * 10/1989 | (JP) . |

OTHER PUBLICATIONS

Ashburn, Paul, Recycling Wastewater Reactor, RFS II, 1991.

Ashburn, Paul, Wastewater Treatment Plant, RFS II, 1991.

* cited by examiner

*Primary Examiner*—Chester T. Barry
*Assistant Examiner*—Fred Prince
(74) *Attorney, Agent, or Firm*—Webb Ziesenheim Logsdon Orkin & Hanson, P.C.

(57) ABSTRACT

A method and equipment are disclosed for tertiary sewage treatment by naturally-occurring microorganisms after the sewage has passed from a septic tank or other primary treatment device. Tertiary treatment occurs within enclosed, controlled conditions in a recirculation tank housing a recirculating spray system and a filter bed. The recirculation process is controlled by a timer and a timer float responding to the wastewater level in the recirculation tank. A mixing zone is provided in a bottom portion of the recirculation tank.

8 Claims, 3 Drawing Sheets

HOME WASTEWATER TREATMENT PLANT

This application claims the benefit of U.S. Provisional Application Ser. No. 60/062,286, filed Oct. 17, 1997, entitled "Home Wastewater Treatment Plant".

BACKGROUND OF THE INVENTION

1. Field of the Invention

This invention relates to methods and equipment for tertiary sewage treatment by naturally-occurring microorganisms after the sewage has passed from a septic tank or other primary treatment device.

2. Description of the Prior Art

Various sewage treatment systems are known for treating the waste stream from small communities, housing developments and single family units. With the establishment of state and federal guidelines, the need has become more acute for a system to handle sewage disposal needs where traditional methods do not work.

Septic tanks are the most commonly used means of treating sewage from a single source. They employ anaerobic bacteria for the primary decomposition of sewage, separating some solid wastes from liquid. The liquid waste streams from septic tanks are often discharged directly to the entry of a subsurface drain field. The remainder of wastewater treatment occurs in the soil. However, many sites and many soil types are unable to accomplish this process in a manner that meets applicable guidelines.

Tertiary treatment systems employ processes in which anaerobic decomposition is followed by aerobic decomposition. Tertiary systems lessen the burden on the land, as soils are no longer being called upon to treat wastewater.

A secondary treatment method wherein aerobic processes are augmented, for example, by a flow of gas through the material to be treated, is known from U.S. Pat. No. 3,202,285. It has also been proposed to use a gravel bed in secondary treatment, as set forth in U.S. Pat. Nos. 3,057,796 and 4,293,421.

U.S. Pat. No. 5,597,477 contains a description of a sewage effluent disposal system comprising a primary sewage treatment tank and an effluent holding tank. A float switch controls the pumping of effluent from the effluent holding tank. Secondary treatment is accomplished by passing the effluent through a sparger as it enters the secondary treatment tank, or by adding disinfectant as the effluent passes through the sparger. The secondary treatment tank does not contain a filtration bed.

It is an object of the present invention to provide a wastewater treatment system in which tertiary treatment occurs in enclosed, controlled conditions rather than in surrounding soils, so that the invention can be used where soils are marginal or cannot be used with other systems.

The tertiary treatment recirculation process may be controlled by a timer and a pump float responding to the wastewater level in the recirculation tank, thus providing an automated control system.

Another object of the invention is to provide a wastewater treatment system as described in the preceding paragraphs in which the effluent is safe and environmentally acceptable. Yet another object of the invention is to provide a durable wastewater treatment system, requiring minimal maintenance, and in which repair and regeneration are readily accomplished.

SUMMARY OF THE INVENTION

Accordingly, I have invented a system for the tertiary treatment of sewage, comprising a septic tank, which catches the solid component of sewage and houses the primary step of the wastewater treatment process. The heavy solids settle to the bottom of the tank, and the lighter solid material floats to the top. Both solid components largely decompose into liquids and gases in the anaerobic conditions present in the primary treatment step. Relatively clear effluent from the middle level of the septic tank flows into a bottom mixing zone of a recirculation tank. A pump moves effluent from the bottom zone to the top zone of the recirculation tank, where it is distributed over a sand filter located in the top zone, for example, by a spray grid. The effluent trickles through the filter medium where it is treated aerobically and anaerobically by naturally occurring microorganisms. The treated effluent is stored in the bottom zone where it is mixed with incoming septic tank effluent. The effluent is discharged either by gravity or a small discharge pump after which it may be subjected to disinfection.

A complete understanding of the invention will be obtained from the following description when taken in connection with the accompanying drawing figures wherein like reference characters identified like parts throughout.

DETAILED DESCRIPTION OF THE PREFERRED EMBODIMENT

Figure 1:
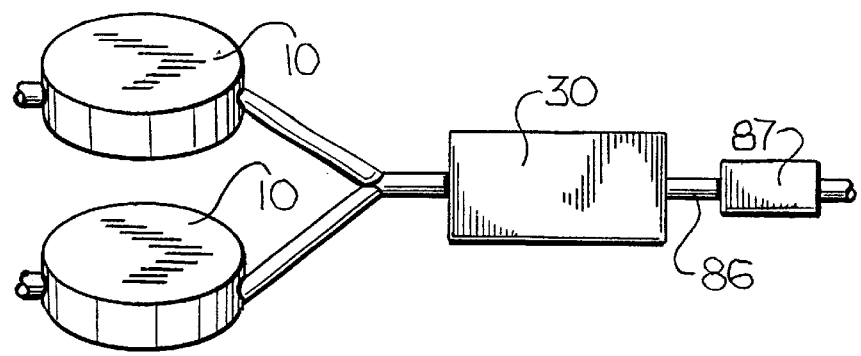
FIG. 1 is a schematic view of the wastewater treatment system of the present invention.

Referring to FIG. 1, one or more septic tanks 10, positioned below ground level, accept raw sewage and carry out primary or anaerobic processing of the sewage. Septic tanks 10 are connected to a recirculation tank 30, also preferably below ground level. Recirculation tank 30 carries out mixing and storage of clarified effluent received from septic tanks 10. After mixing or dilution processing, effluent exits the recirculation tank 30 through one or more outlet lines 86 to optional disinfection device 87.

Figure 2:
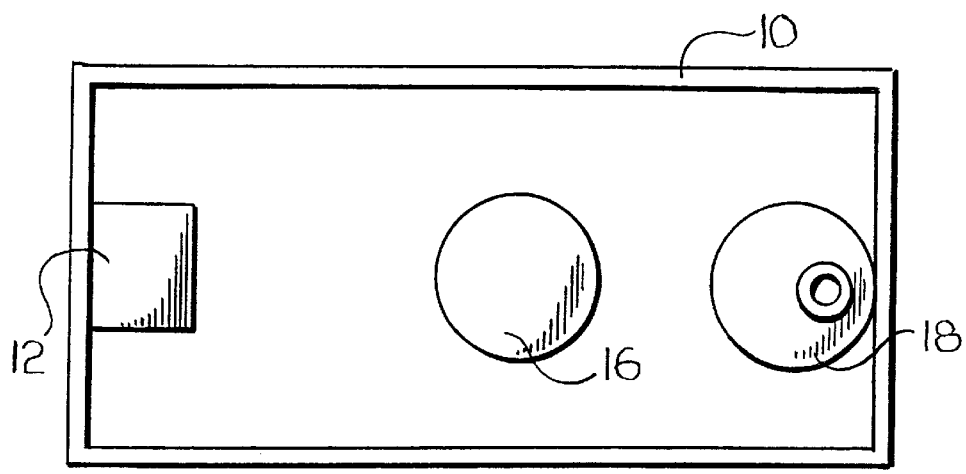
FIG. 2 is an overhead view of a septic tank, according to the invention.
Figure 3:
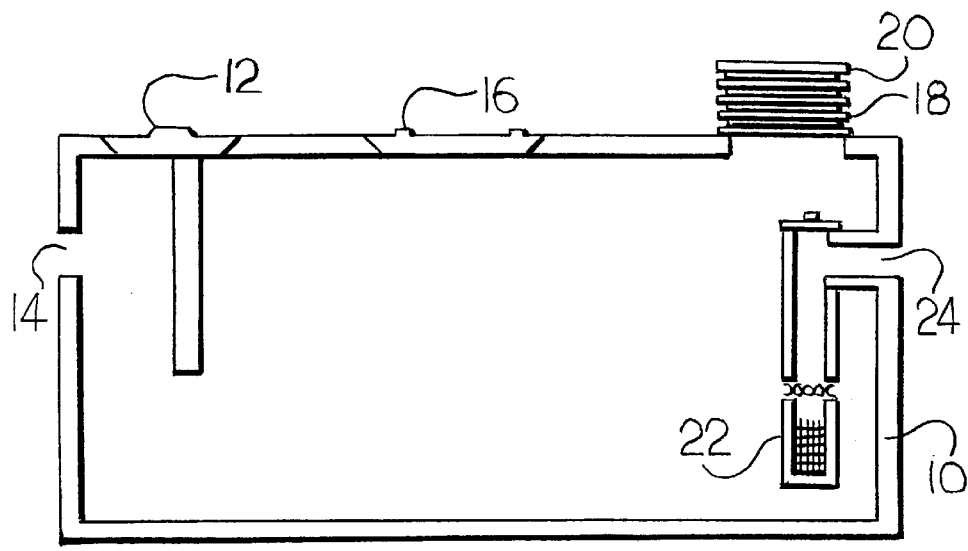
FIG. 3 is a section view of the septic tank of FIG. 2.

Referring to FIGS. 2 and 3, inspection cover 12 allows access to the septic tank's inlet line 14 at its point of entry to the septic tank. The inlet line 14, which delivers raw sewage to the septic tank, is typically positioned towards the top of the septic tank. Cleanout cover 16 allows the removal of accumulated solids from the septic tank. Access riser 18, capped by vented carbon lid 20 and constructed so that there is a minimum of six inches from the top of the riser to grade, allows access to effluent filter 22 and septic tank outlet line 24, positioned opposite inlet line 14. Septic tank outlet line 24 is also positioned to allow passage of the relatively clear effluent from the middle level of the septic tank. Effluent filter 22 prevents solids from passing through septic tank outlet line 24, while allowing the passage of liquids.

Figure 4:
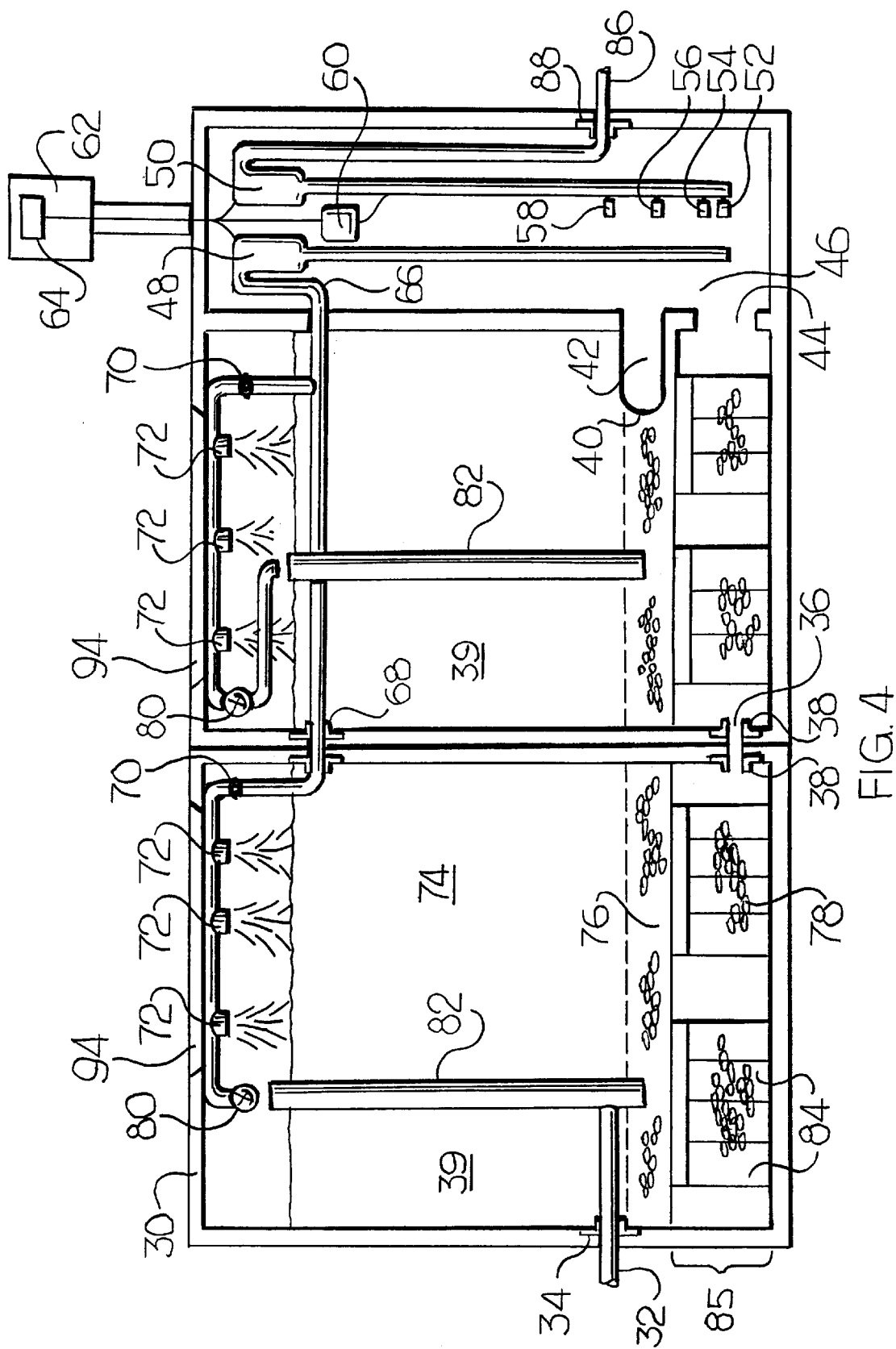
FIG. 4 is a section view of a recirculation tank, according to the invention.

As set forth in FIG. 4, clarified effluent from the septic tank enters recirculation tank 30 through inlet line 32. Flexible seal 34 secures inlet line 32 to recirculation tank 30. The clarified effluent flows downward, then through communicating inlets 36 joining the two filter chambers 39 of recirculation tank 30, then through slotted pipe 40 and upper inlet 42, or through lower inlet 44 to pump chamber 46.

Recirculation pump 48 and discharge pump 50, located within pump chamber 46, are controlled by low water float 52, timer float 54, discharge pump float 56 and high water float 58 electrically connected through junction box 60 to control panel 62 containing timer 64. Optionally, the pump chamber may contain an ultraviolet disinfecting unit or an ozonator to treat the clarified effluent as it enters the recirculating process, or prior to final discharge.

Low water float 52 in the down position switches off power to all pumps in the event of an extreme low-water level. Timer float 54 activates or deactivates the recirculating process controlled by timer 64. Discharge pump float 56 in the up position activates discharge pump 50; in the down position, discharge pump float 56 deactivates discharge pump 50. In the up position, discharge pump float 50 also overrides timer 64 to initiate continuous recirculation. High water float 58 activates an alarm in the event of a high effluent level. This alarm can take the form of various types of indicators, and can be placed in a location remote from the recirculating tank, such as in the user's residence.

Timer 64 is activated when timer float 54 is up. The clarified effluent is then pumped intermittently by recirculation pump 48 through feed pipe 66 and valves 70 to heads 72, positioned above a sand bed 74. Pipe 66 is secured to recirculation tank 30 by flexible seal 68. The spray heads may be helical spray nozzles or another spray diffusion system, such as a conventional brass building sprinkler system spray head, dispersing the liquid into a fine spray to increase the oxygen content of the sprayed effluent and to maximize spray coverage onto the surface of sand bed 74. Effective operation of the spray heads has been found to occur with an orifice demand of 3 gallons per minute at a clarified effluent pressure of 10–15 PSI.

The sprayed effluent passes through sand bed 74, gravel bed 76 and stone bed 78. The sand bed contains, for example, sand with a particle size between 1.5 mm and 2.5 mm, with a uniform coefficient of less than 2. The gravel bed 76 contains, for example, gravel at a size of 3/8"–1/2", and stone bed 78 contains, for example, stone at a size of 1½". Exemplary thicknesses are as follows: sand bed 74 2'0", gravel bed 76 8", and stone bed 78 1'4". As the effluent passes through the sand bed, gravel bed and stone bed, it is treated by the naturally-occurring microorganisms populating the filter. In the event of plugging of the sand bed, overflow lines 82 act as a bypass. At the bottom of recirculation tank 30, the filtered effluent mixes with the clarified effluent entering through inlet line 32. Mixing is accomplished by hydraulic displacement. Infiltrators or a leaching type chamber 84 partially supports stone bed 78 and partially encloses a mixing zone 85 at the bottom of recirculation tank 30 in which the mixing of filtered effluent and clarified effluent can occur. The mixing zone comprises the infiltrators 84 and the stone bed 78 and serves as a holding volume A typical infiltrator or leaching chamber 84 is made from HDPE plastic, has a solid top and a louver configuration on its sides through which effluent passes.

Overflow line valves 80 may be opened to provide a direct infusion of oxygenated recirculated effluent if there is a buildup of flocculant in mixing zone 85 or spray heads 72.

Discharge pump 50 is connected to one or more outlet lines 86 secured to recirculation tank 30 by flexible seals 88. Effluent treated in recirculation tank 30 is discharged to a drip field or to disinfection device 87. Chlorine-containing compounds and exposure to ultraviolet light can be used to disinfect the discharged effluent. Disinfected effluent may meet applicable standards for discharge to a stream or other body of water, or for irrigation use.

Figure 5:
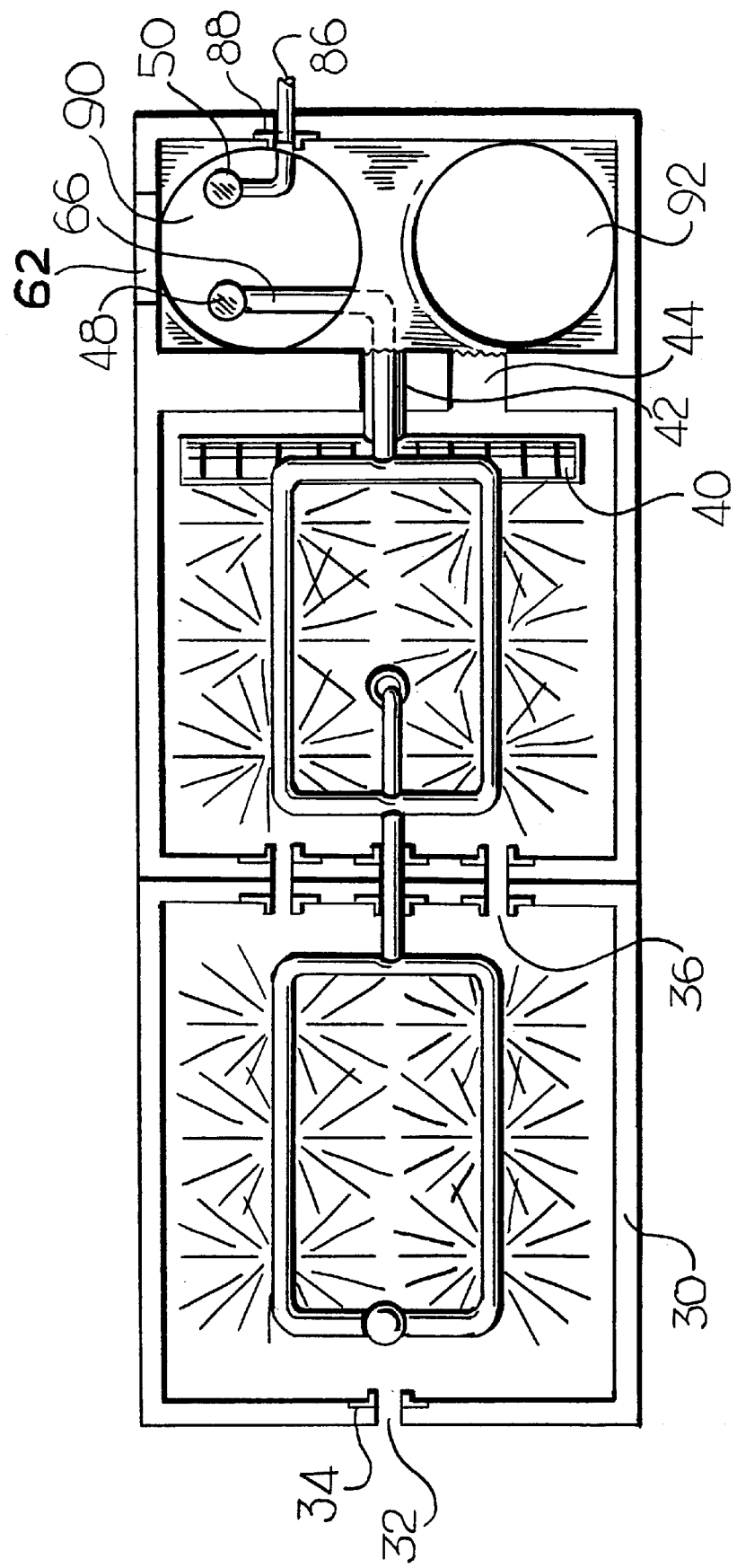
FIG. 5 is an overhead view of the recirculation tank of FIG. 4.

In FIG. 5, access openings 90 and 92 to pump chamber 46 are shown. These openings allow service, repair and replacement of pump, float and control components. Inspection lids 94 allow access to spray heads 72 for servicing.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. A system for treatment of sewage comprising:

a primary sewage processing device;

a recirculation tank provided in fluid communication with said primary sewage processing device for further treating the sewage aerobically;

filter media contained within said recirculation tank;

pump means provided in said recirculation tank for pumping effluent from the bottom of said recirculation tank;

spray means, connected to said pump means, for discharging effluent onto said filter media;

a mixing zone defined in a lower portion of said recirculation tank, said mixing zone having a first end and a second end, and comprising a stone bed and a plurality of leaching chambers; and means for discharging effluent from said recirculation tank, wherein said sewage is communicated from said primary sewage processing device to the first end of said mixing zone, and wherein said pump means is located at the second end of said mixing zone.

2. The system of claim 1 further comprising a means for disinfection of effluent discharged from said recirculation tank.

3. The system of claim 1 wherein said pump means comprises a recirculation pump and a timer float provided in contact with the effluent in said recirculation tank so that when the effluent rises to a predetermined level, the recirculation pump is activated.

4. A method for treating sewage, comprising the steps of:

a) subjecting the sewage to primary treatment;

b) transferring at least a portion of the sewage treated in step (a) to a recirculation tank having filter media and a mixing zone, the mixing zone positioned below the filter media, having a first end and a second end, and comprising a stone bed and a plurality of leaching chambers, said sewage being transferred, before passing it through the filter media, to the first end of the mixing zone to produce mixed effluent;

c) removing mixed effluent from the second end of the mixing zone;

d) treating the mixed effluent removed in step c) aerobically within the recirculation tank by passing it through filter media in a cyclical manner to produce treated effluent;

e) passing the treated effluent through the mixing zone; and f) discharging the treated effluent;

wherein the removing of step (c) further comprises pumping effluent from the bottom of said recirculation tank to the top of said recirculation tank, and wherein the pumping of effluent further comprises pumping the effluent through spray heads positioned above said filter media.

5. The method of claim 4 further comprising the disinfection of effluent discharged from said recirculation tank.

6. The method of claim 5 wherein said disinfection includes treatment with a chlorine-containing chemical compound.

7. The method of claim 5 wherein said disinfection includes treatment with ultraviolet rays.

8. The method of claim 4 wherein the mixing zone is located at the bottom of the recirculation tank.

* * * * *